United States Patent [19]

Aruga et al.

[11] Patent Number: 4,844,048

[45] Date of Patent: Jul. 4, 1989

[54] BREAD BAKING APPLIANCE

[75] Inventors: Akio Aruga; Ikuya Kubota; Tetsuo Kuroiwa; Yoshisada Misawa, all of Amenomiya Kohshoku, Japan

[73] Assignee: MK Seiko Co., Ltd., Kohshoku, Japan

[21] Appl. No.: 155,029

[22] Filed: Feb. 11, 1988

[30] Foreign Application Priority Data

Oct. 15, 1987 [JP] Japan .................................. 62-158092

[51] Int. Cl.$^4$ ............................................. A47J 37/00
[52] U.S. Cl. .................................. 126/21 R; 126/281; 126/389; 99/348
[58] Field of Search ................... 126/21 A, 21 R, 373, 126/377, 378, 389, 266, 267, 198, 190, 281; 219/400; 99/348

[56] References Cited

U.S. PATENT DOCUMENTS 821,795  5/1906  Gerlach ............................... 126/266

Primary Examiner—Albert J. Makay
Assistant Examiner—Carl D. Price
Attorney, Agent, or Firm—Harris, Kern, Wallen & Tinsley

[57] ABSTRACT

A baking appliance having an oven case, a bread case in the over case, an impeller installed at the bottom of the bread case and driven by a motor, a lid unit for the over case, a heater for the over case, and a control unit for the heater and motor, with the lid unit comprising an outer lid and an inner lid joined together in spaced relation providing a lid space therebetween with vent holes for flow into and out of the lid space.

1 Claim, 2 Drawing Sheets

BREAD BAKING APPLIANCE

BACKGROUND OF THE INVENTION

The present invention relates to a bread baking appliance which automatically and continuously conducts all of the bread baking processes, such as mixing, kneading, rising, and baking.

The conventional baking system utilizes separate processes for dough preparing and for baking, and could not operate in one continuous process. A new household appliance which can bake bread in one continuous process has been introduced recently. This new appliance has a bread case provided with an impeller on its bottom, a heater element located around the lower part of the case, and a timer controller for timing to knead, rise, and bake. However, the appliance generally has too large a temperature difference, the temperature being low at the lid and high around the lower part, resulting in incomplete baking at the upper side of the bread. The temperature difference also creates a humid atmosphere in the bread case causing the bread to contain more water. This appliance is shown in FIG. 4.

SUMMARY OF THE INVENTION

It is an object of the invention to provide a new and improved baking appliance which overcomes the disadvantages of the conventional device by maintaining a more uniform temperature in the oven case and by eliminating the humid atmosphere in the bread case.

The baking appliance of the invention includes an oven case, a bread case in the oven case, an impeller installed at the bottom of the bread case and driven by a motor, a lid unit for the oven case, a heater for the oven, and a control unit for the heater and motor. The lid unit comprises an outer lid and an inner lid joined together in spaced relation providing a lid space therebetween, with a first vent hole in the inner lid, and a second vent hole in the outer lid. The preferred embodiment also includes an oven case having an upper outer edge with a plurality of openings therethrough disposed around the oven case and a plurality of corresponding openings through the lid, for air flow from around the oven case into the lid space.

DESCRIPTION OF THE PREFERRED EMBODIMENT

Figure 1:
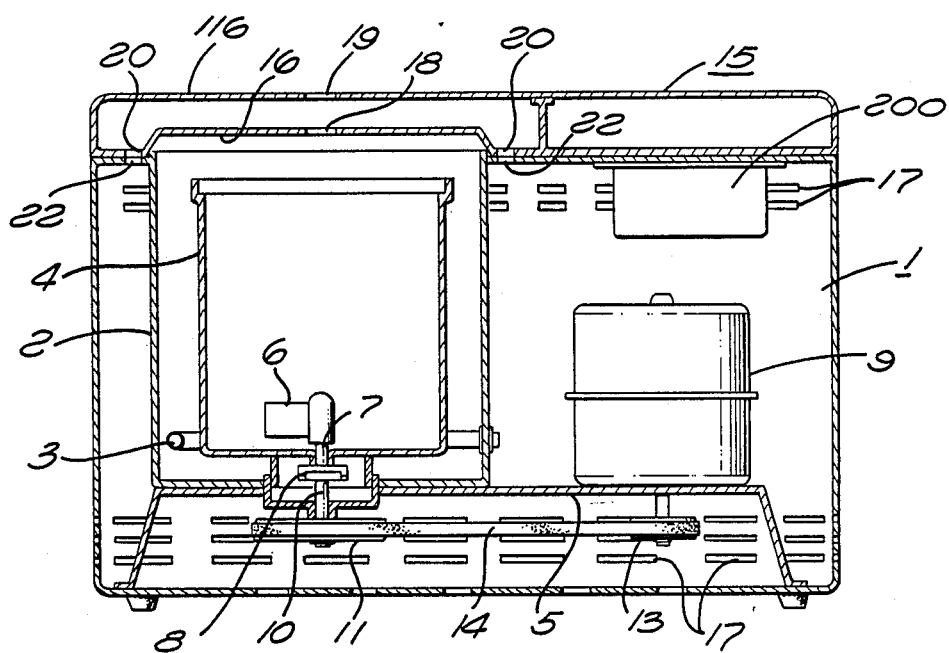
FIG. 1 is a sectional view of a baking appliance incorporating the presently preferred embodiment of the invention.
Figure 2:
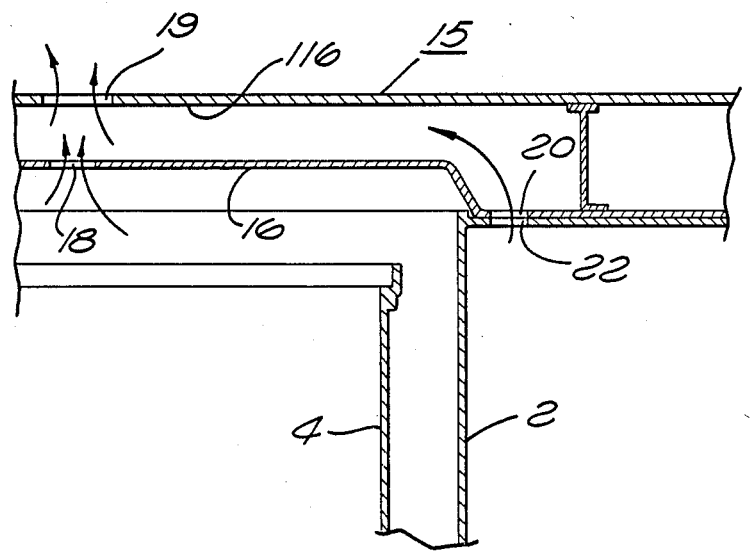
FIG. 2 is an enlarged partial sectional view of the lid of the bakery appliance of FIG. 1.
Figure 3:
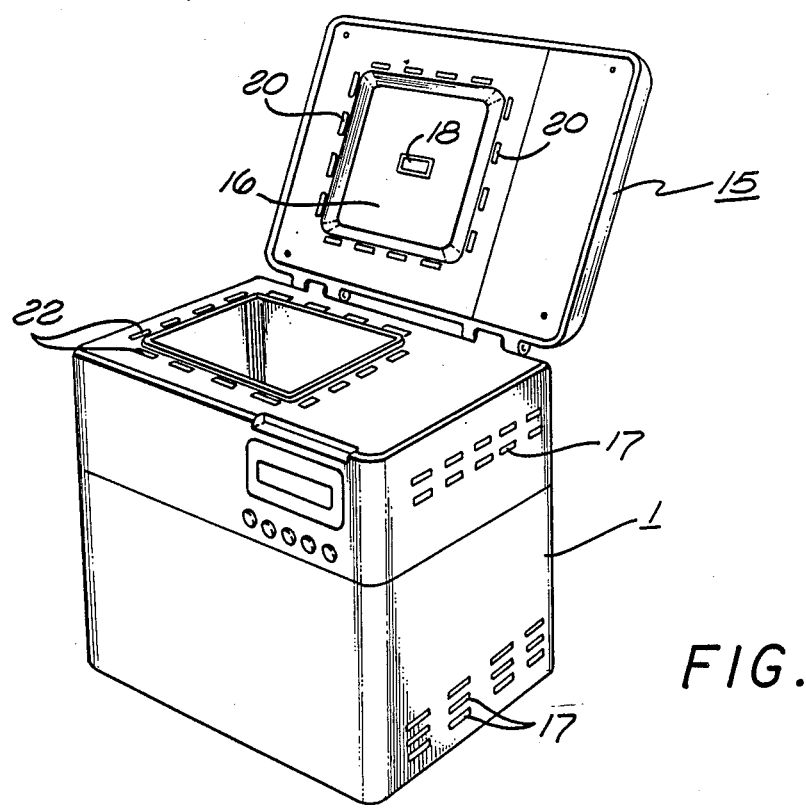
FIG. 3 is a perspective view of the baking appliance of FIG. 1.

The present invention will now be described in a greater detail with reference to the preferred embodiment of the invention as shown in FIGS. 1-3.

FIG. 1 is a sectional view of the baking appliance. The baking appliance includes a housing enclosure 1 equipped with an oven case 2 and a motor 9. The oven case 2 is assembled into a box shape with stainless steel plates, has an opening at the top and is equipped with an electric heater element 3 as a heat source. This case 2 is installed inside the baking appliance housing 1 on a mounting plate 5. The motor 9 is also mounted in the same way. A bread case 4 is removably installed in the oven case 2 and its inner surface may be coated with a resin.

At the bottom of the bread case, a rotary shaft 7 is installed to rotate an impeller 6 which kneads dough. The rotary shaft 7 is connected by a coupler 8 with another rotary shaft 10 mounted outside the bread case 4 on the plate 5. The rotary shaft 10 is further connected with the motor 9 by a belt 14 running in pulleys 11 and 13.

Slots 17 are provided in the housing 1 for ventilation to cool the outside of the oven case 2. A lid unit 15 consisting of an inner lid 16 and an outer lid 116 is mounted by hinges to the housing 1 of the baking appliance.

Figure 4:
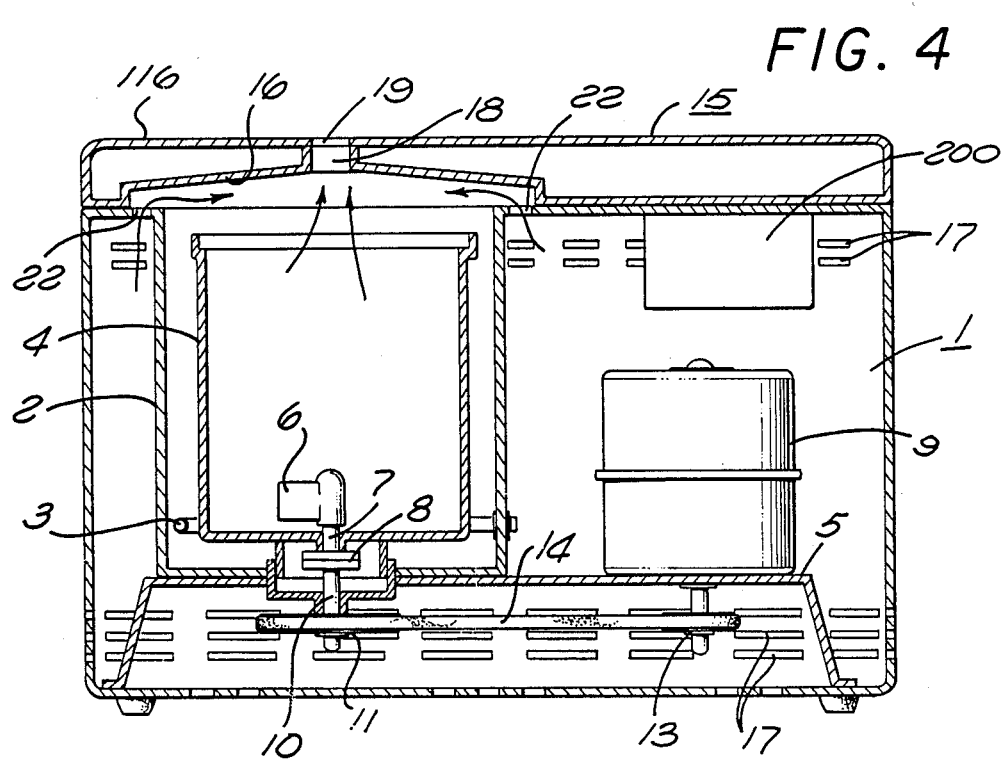
FIG. 4 is a sectional view of a conventional baking appliance.

A control unit 200 includes a micro processor, and controls the electric power to the heater element 3 and the operation of the motor 9 according to a sequence program. As described thus far, the baking appliance of the invention may be the same as the prior art baking appliance of FIG. 4.

FIG. 2 is an enlarged sectional view of the lid unit 15 and the oven case 2. There is a space between the inner lid 16 and the outer lid 116. A vent hole 18 located at the center of the inner lid 16 lets out the steam from the oven case 2 and the bread case 4. An exhaust hole 19 in the outer lid 116 exhausts the steam from the space between the lids.

FIG. 3 is a perspective view of the baking appliance with the lid unit 15 open. A number of vent holes 22 are provided along the edge of the opening of the oven case 2, and also a number of inlet holes 20 are provided in the inner lid 15 aligned with the vent holes 22 when the lid is closed on the housing. The steam and heat generated in the oven case 2 and bread case 4 flow first into the internal space of the lid unit 15 raising its temperature, and then flow out of the lid unit into the surrounding atmosphere.

As schematically illustrated, the lid unit 15 is heated during baking, and the temperature in the oven case 2 becomes even and avoids incomplete baking. The steam generated from the bread is let out through the vent hole 18 in the inner lid, is mixed with the heated air introduced through the inlet holes 22, 20, and is exhausted through the exhaust hole 14. Since the steam is quickly removed, good quality bread is baked merely by pushing the start button to activate the control unit 200.

We claim:

1. In a baking appliance having a housing, an oven case in said housing, a bread case in said oven case, an impeller installed at the bottom of said bread case and driven by a motor, a lid unit for said oven case, a heater for said oven case, and a control unit for said heater and motor, an improved lid unit comprising an outer lid and an inner lid joined together in spaced relation providing a lid space therebetween, a first vent hole in said inner lid providing a first continuous flow path between said bread case and said lid space to introduce steam generated in said bread case into said lid space, and a second vent hole in said outer lid providing a second continuous exhaust flow path from said lid space, with said housing having a plurality of openings around said oven case, and said inner lid having a plurality of corresponding openings therethrough, with said openings providing a third continuous air flow path from around said oven case into said lid space and with said third flow path joining said first flow path in said lid space.

* * * * *